US008823222B2

(12) United States Patent
Lau et al.

(10) Patent No.: US 8,823,222 B2
(45) Date of Patent: Sep. 2, 2014

(54) COOLING SYSTEM OF MOTOR ASSEMBLY FOR CLEANER

(75) Inventors: James Ching Sik Lau, Hong Kong (CN); Zhan Cai, Shenzhen (CN)

(73) Assignee: Johnson Electrica S.A., Murten (CH)

( * ) Notice: Subject to any disclaimer, the term of this patent is extended or adjusted under 35 U.S.C. 154(b) by 465 days.

(21) Appl. No.: 13/105,519

(22) Filed: May 11, 2011

(65) Prior Publication Data

US 2011/0277254 A1 Nov. 17, 2011

(30) Foreign Application Priority Data

May 11, 2010 (CN) .......................... 2010 1 0174457

(51) Int. Cl.
*H02K 9/19* (2006.01)
*H02K 9/20* (2006.01)
*A47L 7/00* (2006.01)
*H02K 9/22* (2006.01)
*H02K 1/20* (2006.01)
*A47L 11/34* (2006.01)
*A47L 11/40* (2006.01)

(52) U.S. Cl.
CPC .. *H02K 9/22* (2013.01); *H02K 9/19* (2013.01); *H02K 1/20* (2013.01); *A47L 11/34* (2013.01); *A47L 11/4083* (2013.01)
USPC .................. 310/54; 15/320; 15/322; 15/347; 310/52; 310/60 A; 310/64

(58) Field of Classification Search
CPC ............. H02K 1/20; H02K 9/19; H02K 9/22; A47L 11/34; A47L 11/4083
USPC .................. 310/54, 64, 52, 58, 60 A; 15/21.1
IPC .............................. H02K 9/22, 9/19; A47L 7/00
See application file for complete search history.

(56) References Cited

U.S. PATENT DOCUMENTS

| | | | | |
|---|---|---|---|---|
| 2,913,988 A | * | 11/1959 | White | 417/357 |
| 3,630,645 A | * | 12/1971 | Eheim | 417/420 |
| 3,980,909 A | * | 9/1976 | Klein | 310/50 |
| 4,213,745 A | * | 7/1980 | Roberts | 417/363 |
| 4,268,935 A | * | 5/1981 | Bessinger | 15/320 |
| 4,360,946 A | * | 11/1982 | Marshall et al. | 15/321 |
| 4,691,131 A | * | 9/1987 | Nakano | 310/54 |
| 5,040,950 A | * | 8/1991 | Dalquist et al. | 417/234 |
| 5,509,463 A | * | 4/1996 | Callaway et al. | 165/46 |
| 5,620,646 A | * | 4/1997 | Sparer et al. | 310/54 |
| 5,930,852 A | * | 8/1999 | Gravatt et al. | 4/541.1 |
| 6,200,108 B1 | | 3/2001 | Caudill et al. | |
| 6,222,289 B1 | * | 4/2001 | Adames | 310/54 |

(Continued)

OTHER PUBLICATIONS

Gieras et al, "Analysis of an Universal Permanent Magnet Brushless Motor Drive" in IEEE, Jan. 1996.*

*Primary Examiner* — John K Kim
(74) *Attorney, Agent, or Firm* — Muncy, Geissler, Olds & Lowe, P.C.

(57) ABSTRACT

A motor assembly, especially for home appliances such as a cleaner, has an electric motor and a cooling system. The motor may be a fractional horsepower universal motor with a stator and a rotor. The cooling system has a cooling pipe thermally coupled to an element of the stator, such as a core of the stator and providing a flow path for a liquid to cool the motor.

9 Claims, 4 Drawing Sheets

(56) References Cited

U.S. PATENT DOCUMENTS

| | | | |
|---|---|---|---|
| 6,748,622 B2* | 6/2004 | Lee et al. | 15/320 |
| 6,992,411 B2* | 1/2006 | Houle et al. | 310/52 |
| 7,105,959 B2* | 9/2006 | Yamamoto et al. | 310/52 |
| 7,635,932 B2* | 12/2009 | Matin et al. | 310/58 |
| 7,657,965 B2* | 2/2010 | Scott et al. | 15/320 |
| 7,802,614 B2* | 9/2010 | Elnar | 165/46 |
| 8,110,960 B2* | 2/2012 | Bischof et al. | 310/227 |
| 8,354,763 B2* | 1/2013 | Hashiba | 310/54 |
| 8,643,233 B2* | 2/2014 | Houle et al. | 310/52 |
| 2002/0005671 A1* | 1/2002 | Welke et al. | 310/52 |
| 2005/0022333 A1* | 2/2005 | McDowell et al. | 15/320 |
| 2005/0067904 A1* | 3/2005 | Houle et al. | 310/54 |
| 2007/0044269 A1* | 3/2007 | Day | 15/321 |
| 2007/0210656 A1* | 9/2007 | Lafontaine et al. | 310/58 |
| 2008/0164773 A1* | 7/2008 | Wang | 310/54 |
| 2009/0160269 A1* | 6/2009 | Bischof et al. | 310/52 |
| 2009/0261668 A1* | 10/2009 | Mantere | 310/54 |
| 2009/0265878 A1* | 10/2009 | Bilek et al. | 15/347 |
| 2011/0241459 A1* | 10/2011 | Hashiba | 310/54 |
| 2011/0277254 A1* | 11/2011 | Lau et al. | 15/21.1 |
| 2011/0309695 A1* | 12/2011 | Huard | 310/46 |

* cited by examiner

COOLING SYSTEM OF MOTOR ASSEMBLY FOR CLEANER

CROSS REFERENCE TO RELATED APPLICATIONS

This non-provisional patent application claims priority under 35 U.S.C. §119(a) from Patent Application No. 201010174457.6 filed in The People's Republic of China on May 11, 2010.

FIELD OF THE INVENTION

This invention relates to an electric motor assembly and in particular, to a water cooled electric motor for use in home appliances. The power of the motor is preferably not more than 3,000 watts. Preferably, the electric motor is rated as a fractional horsepower motor.

BACKGROUND OF THE INVENTION

Traditional small electric motors, especially fractional horsepower motors, are usually air cooled by an axial fan mounted on the rotor shaft to generate a flow of air. Because of the fan, the size of the motor is increased and the efficiency of the motor is decreased.

Further more, in specified applications, there is not enough space for a channel or passage within the motor or stator for the air flow, preventing the heat from dissipating quickly.

Hence there is a desire for a small size electric motor with improved cooling.

SUMMARY OF THE INVENTION

This is achieved in the present invention by using a liquid cooling system to cool the stator of the motor.

Accordingly, in one aspect thereof, the present invention provides a motor assembly comprising an electric motor and a cooling system, the motor comprising a stator and a rotor rotatably mounted to the stator, wherein the cooling system comprises a cooling pipe thermally coupled to an element of the stator and providing a flow path for a liquid.

Preferably, the cooling pipe is at least partially embedded in a stator core of the stator.

Preferably, the cooling pipe comprises a plurality of straight pipes and a plurality of bent pipes, the bent pipes interconnecting the straight pipes and the straight pipes extending axially and being at least partly embedded in a core of the stator.

Alternatively, the motor assembly comprises a thermally conductive ring member disposed around the stator, and the cooling pipe is disposed inside the ring member.

Preferably, the cooling pipe is spirally embedded inside the ring member.

Preferably, the motor assembly comprises a tank for storing the liquid and a pump arranged to move the liquid through the cooling pipe.

Preferably, the motor assembly further comprises at least one spray nozzle arranged to spray the liquid onto a working area after the liquid has passed through the cooling pipe.

Preferably, the motor assembly further comprises an electric heating member arranged to heat the liquid from the cooling pipe to a predetermined temperature before being sprayed from the at least one spray nozzle.

Preferably, the liquid is water or water mixed with detergent.

Preferably, the working area is a roller brush of a cleaner.

Preferably, the rated power of the motor is equal to or less than 3,000 watts.

Preferably, the motor is a fractional horsepower universal motor.

By implementing the invention, the motor is cooled by the liquid coolant such as water inside a cooling pipe that is thermally coupled to the stator. Thus the size of the motor can be decreased without reducing the power of the motor or the power of the motor increased without increasing the size of the motor. In other words, the power density of the motor can be increased.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
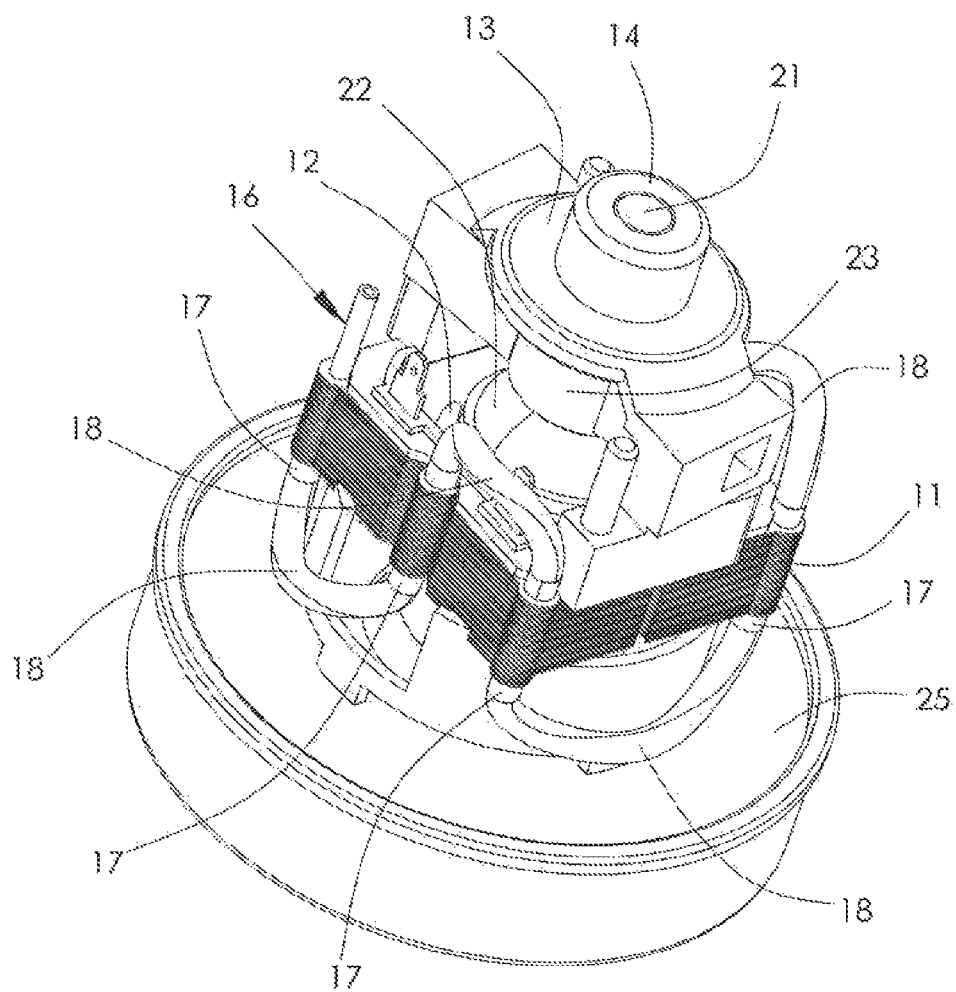
FIG. 1 is a view of a blower incorporating an electric motor according to a first embodiment of the present invention.

FIG. 1 illustrates a motor assembly according to a first embodiment of the present invention. The motor assembly is a blower as used for example in a carpet cleaner or vacuum cleaner. The blower has an electric motor driving an impeller 25 which creates the vacuum for the appliance. The motor is a low power universal motor, preferably no more than 3,000 watts. Optionally, the motor is a fractional horsepower motor. The motor comprises a stator and a rotor 22 rotatably mounted to the stator. The stator comprises stator core 11, stator windings wound about teeth 12 of the stator core, brush gear disposed at one end of the stator core, and support members such as bearing brackets 13 mounted at respective ends of the stator core for rotatably supporting the rotor. The rotor comprises a shaft 21, rotor core mounted to the rotor shaft, a commutator 23 fixed to the rotor shaft adjacent to the rotor core, and rotor windings wound about teeth of the rotor core and electrically connected to segments of the commutator. Bearings 14 are mounted to respective support members for supporting the rotor shaft 21. The load in the form of the impeller 25 is fixed onto one end of the shaft 21.

The motor assembly further comprises a cooling pipe 16. The cooling pipe 16 comprises a plurality of straight pipes 17 and a plurality of bent pipes 18. The straight pipes 17 extend axially and are partly embedded in the stator core 11. The straight pipes 17 are made of thermally conductive material such as aluminum or aluminum alloy. The bent pipes 18 serially connect the straight pipes 17. The bent pipes 18 are made of flexible material such as rubber. In this embodiment, mounting holes are prefabricated in the stator core laminations. The stator core laminations are then laminated along the straight pipes 17. The outside diameter of the straight pipes 17 is slightly larger than the inner diameter of the mounting holes. In other words, the straight pipes 17 are preferably a press fit with the mounting holes to improve the thermal conductivity between the stator core 11 and the straight pipes 17.

The cooling pipe 16 is filled with coolant for removing the heat. Preferably, the coolant is water driven by a pump (not shown). The pump may be driven by the motor itself, or driven by another motor. Alternatively, a water tank (not shown) is disposed above the stator core 11 and the inlet of the cooling pipe 16 is connected directly to the water tank. In this arrangement the water flows through the cooling pipe 16 under the influence of gravity.

In this embodiment, the motor is cooled by the cooling pipe 16 being embedded directly in the core of the stator. Compared to a traditional motor assembly having an axial fan, the size particularly the axial dimension of the motor assembly according to an embodiment of the invention is decreased.

Figure 2:
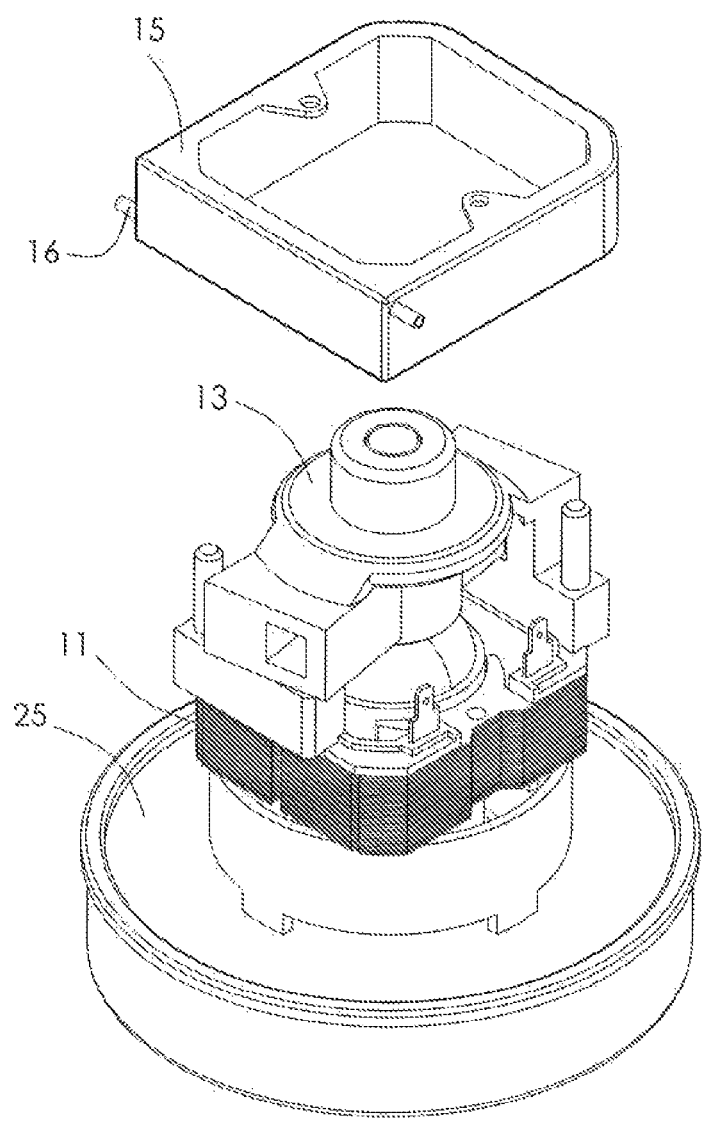
FIG. 2 is a partially exploded view of a blower incorporating an electric motor according to a second embodiment of the present invention.
Figure 3:
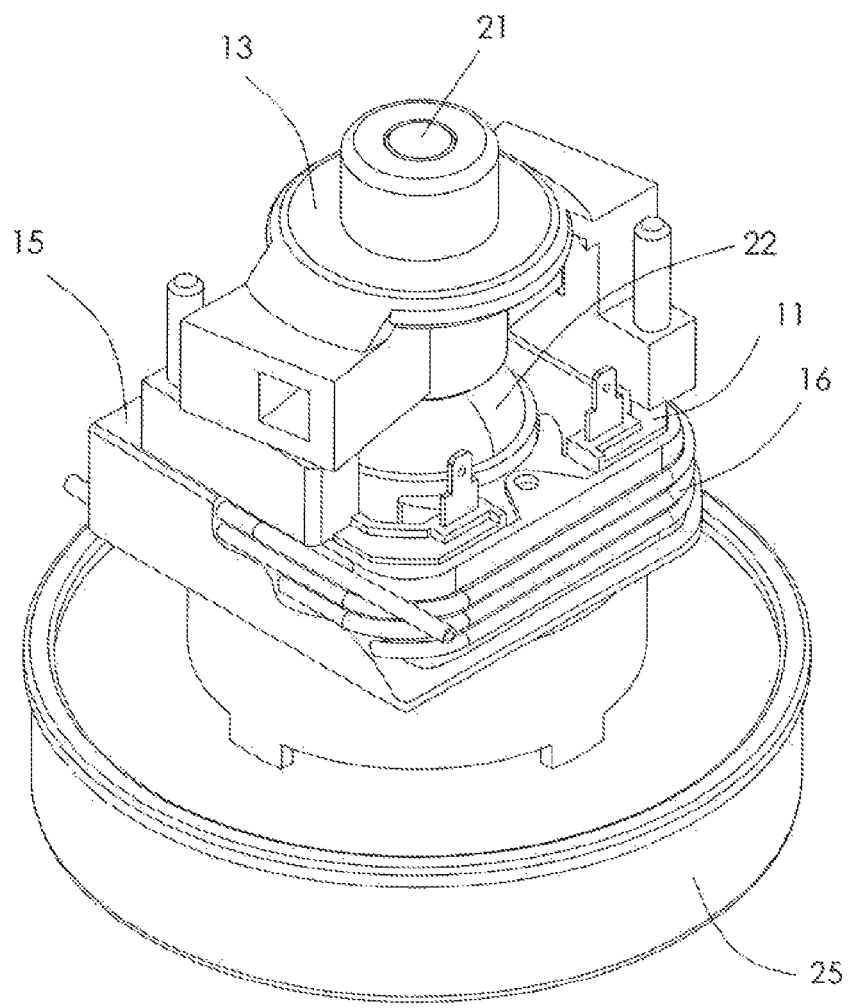
FIG. 3 is an assembled view of the blower of FIG. 2 with a part partially sectioned.

FIG. 2 and FIG. 3 illustrate another motor assembly according to a second embodiment of the present invention. The motor assembly is shown fitted to a blower similar to the blower of FIG. 1. In this embodiment, the cooling pipe 16 is not embedded into the stator core 11. Instead, the cooling pipe 16 is disposed around the stator core 11 in a thermally conductive way, such that the cooling pipe is thermally coupled to the stator core. Specifically, the motor assembly comprises a thermally conductive ring member forming a cooling jacket 15 made of thermally conductive material such as aluminum. The cooling pipe 16 is spirally embedded inside the jacket 15. The cooling jacket 15 is mounted around the stator core 11, with thermally conductive silicone filled between the jacket 15 and the stator core 11, to improve the thermal connection between the stator core 11 and the jacket 15. The cooling pipe 16 is made of a thermal conductive material. The jacket 15 and the cooling pipe 16 are preferably formed as one single piece by molding.

Alternatively, the cooling pipe 16 is wound about the stator core 11 directly. In another alternative embodiment, the stator core 11 is mounted inside a cylindrical metal housing and the cooling pipe 16 is wound about the metal housing.

Figure 4:
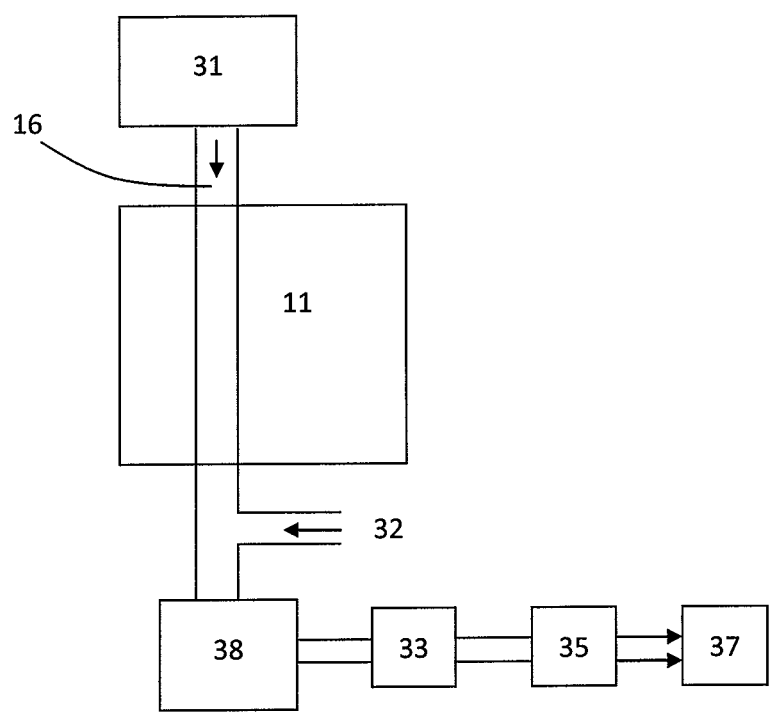
FIG. 4 is a schematic representation of a cleaner incorporating an electric motor according to the present invention.

FIG. 4 is a schematic block diagram representing a motor assembly for a cleaner, especially a floor cleaner or carpet cleaner. The cleaner has a spray system for spraying detergent or a detergent mixture. The motor assembly comprises a motor, a cooling pipe for transferring heat from the motor, a water tank, a pump, an electric heating member, at least one nozzle, at least one sensor, and a control circuit etc. The inlet of the cooling pipe 16 is connected to the water tank 31. The pump 33 is connected to the outlet of the cooling pipe 16.

In use, the water from the tank 31 flows through the pipe 16 where it is heated by the heat of the stator core 11. Detergent, as indicated by arrow 32, is introduced into the water flow to produce a detergent mixture. The pump forces the detergent mixture through the spray nozzle 35, to spray the detergent mixture onto a working area such as the roller brushes 37 of the cleaner. As is generally known, to maximize the cleaning effect of detergent, the detergent mixture should be within a specific temperature range. Therefore, the electric heating member 38 is disposed between the outlet of the cooling pipes 16 and the nozzles 35, to heat the detergent mixture to the desired temperature. The sensor senses the temperature of the detergent mixture. The water flow and/or the detergent flow and/or the heating element may be controlled by the control circuit to make sure that the detergent mixture is heated to the desired temperature.

In this embodiment, heat from the motor is used to heat the water. In other words, the heat of the motor is reused rather than dissipated to the environment. This reduces the energy required by the heating element to heat the detergent mixture. The solution is particularly useful for applications that require the water to be heated to a specific temperature, whereby the energy used by a secondary heating unit can be reduced by warming the water with waste heat from the motor. For instance, the solution can be used in a coffee machine, soy milk maker, cleaner, etc.

The motor shown in the embodiments is a universal motor. However, the motor could be a brushless motor having a stator with a stator core and stator windings, or a PMDC motor with a wound rotor and a permanent magnet stator. Preferably, the motor has a power rating of 3,000 watts or less. Ideally the motor is a fractional horsepower motor.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A motor assembly comprising an electric motor and a cooling system, the motor comprising a stator and a rotor rotatably mounted to the stator,
   wherein the cooling system comprises a cooling pipe thermally coupled to an element of the stator and providing a flow path for a liquid, the cooling pipe comprising a plurality of straight pipe sections and a plurality of bent pipe sections interconnecting the straight pipe sections; and
   wherein the stator comprises a stator core comprising a plurality of laminations laminated along the straight pipe sections,
   wherein the motor assembly further comprises:
      a tank for storing the liquid connected to the cooling pipe;
      a pump arranged to move the liquid through the cooling pipe;
      at least one spray nozzle arranged to spray the liquid onto a roller brush of a cleaner after the liquid has passed through the cooling pipe; and
      an electric heating member arranged to heat the liquid from the cooling pipe to a predetermined temperature before being sprayed from the at least one spray nozzle.

2. The motor assembly of claim 1, wherein the cooling pipe is at least partially embedded in a stator core of the stator.

3. The motor assembly of claim 1, wherein the liquid is water or water mixed with detergent.

4. The motor assembly of claim 1, wherein the rated power of the motor is less than or equal to 3,000 watts.

5. The motor assembly of claim 1, wherein the motor is a fractional horsepower universal motor.

6. The motor assembly of claim 1, wherein each of the laminations defines a plurality of cooling pipe mounting holes and the straight pipe sections are a press fit with corresponding mounting holes.

7. The motor assembly of claim 6, wherein the mounting holes are closed holes.

8. The motor assembly of claim 1, further comprising an impeller located at one axial end of the stator, wherein the impeller has an outer diameter greater than that of the stator core.

9. The motor assembly of claim 1, wherein the straight pipes of the cooling pipe extends axially.

\* \* \* \* \*